Dec. 1, 1931.  A. T. KVARNSTROM  1,834,162
AUTOMOBILE BRAKE
Filed Oct. 2, 1930  2 Sheets-Sheet 1
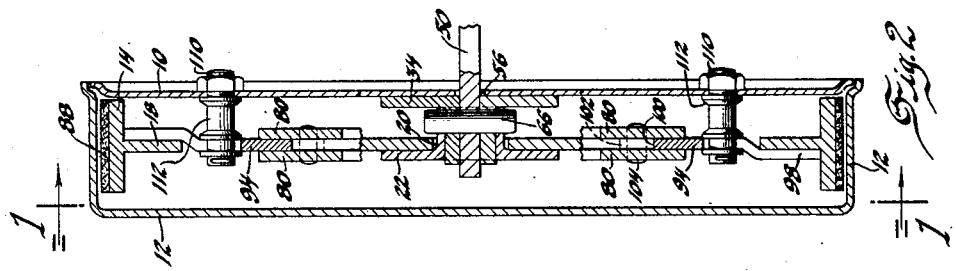
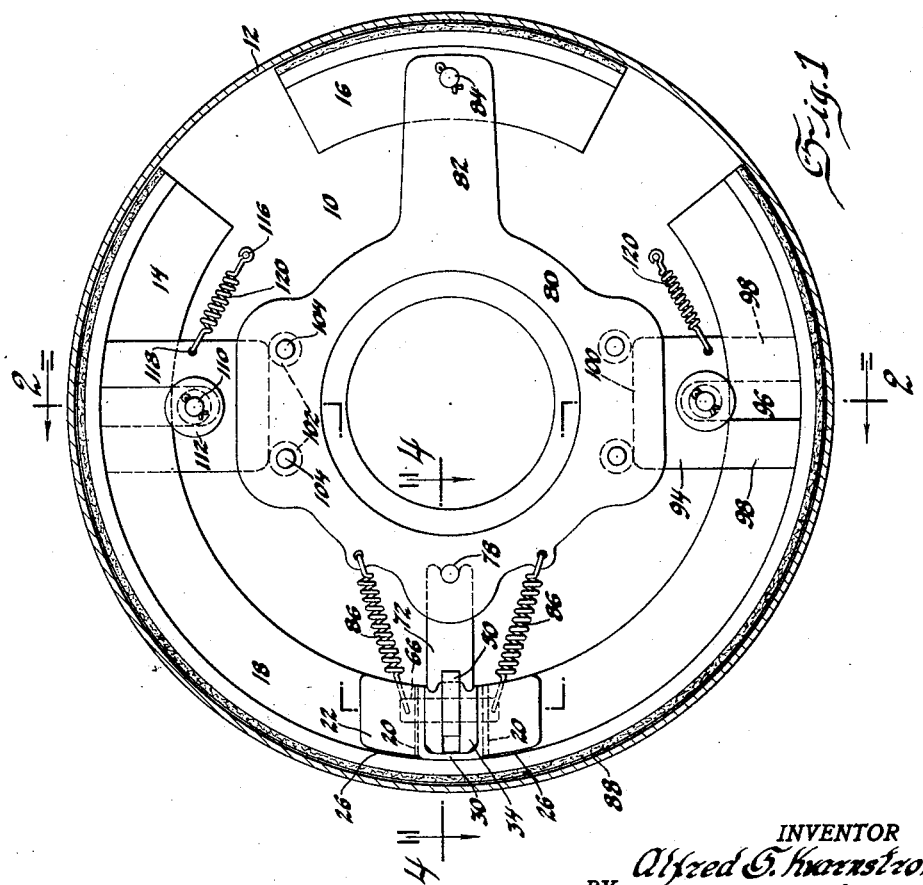
INVENTOR
Alfred G. Kvarnstrom
BY Francis D. Hardesty
ATTORNEY

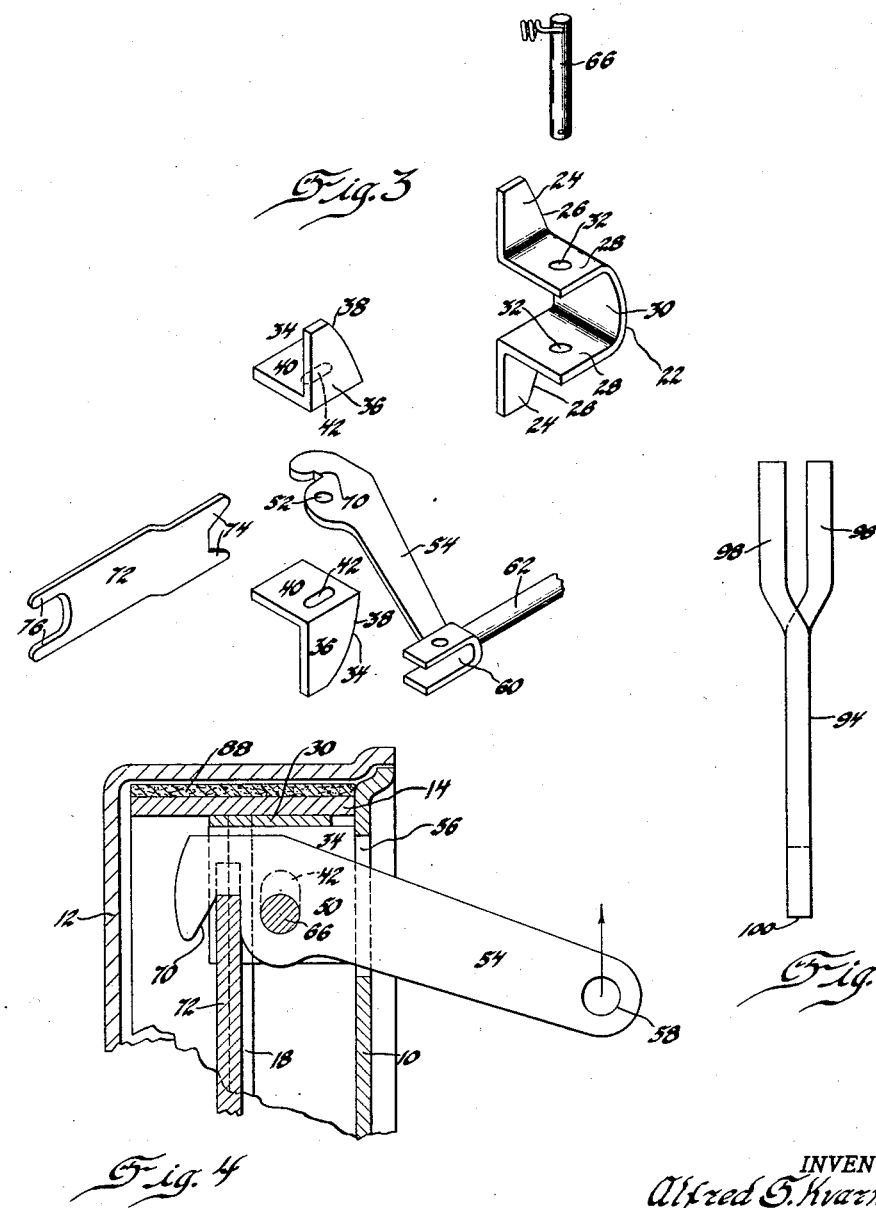

Patented Dec. 1, 1931

1,834,162

UNITED STATES PATENT OFFICE

ALFRED T. KVARNSTROM, OF DETROIT, MICHIGAN

AUTOMOBILE BRAKE

Application filed October 2, 1930. Serial No. 485,895.

This invention relates to brakes and more particularly to automobile brakes of the expanding type.

An object of this invention is a brake including a substantially flexible brake band having two separated portions or segments, adapted to be moved in opposite directions when a braking force is applied and to engage and hold, frictionally, a rotating drum whose rotation is to be restrained.

A further object is a brake whose brake band includes two separated segments operatively connected to each other in such a manner that movement of one causes movement of portions of the other, such movement generally taking place only when an extraordinary braking load arises.

Still further objects are novel details of connections between a brake band, an anchor plate, an operating lever, and an operating link.

A still further object is a brake having a plurality of anchors for its major segment, each of the anchors being of the full floating type, A still further object is a brake which is so constructed that a relatively great clearance can be maintained between its band and the drum.

A still further object is a novel brake, one which is more efficient in its operation and simpler of construction than brakes heretofore known to the art.

Still further objects will readily occur to those skilled in the art upon reference to the following description and the accompanying drawings in which Fig. 1 shows a brake of the invention, in section on the line 1—1 of Fig. 2.

Fig. 2 is a section on the broken line 2—2 of Fig. 1.

Fig. 3 is an exploded perspective view of the details forming the connections between the brake band, the anchor plate, the operating lever and the operating link.

Fig. 4 is a section as if on the line 4—4 of Fig. 1.

Fig. 5 shows a connecting link in side elevation.

Referring to the drawings, and more particularly to Figs. 1 and 2, it will be seen that the brake includes an anchor plate 10 which cooperates with the rotatable brake drum 12 to form a receptacle for the brake band and its operating parts.

The brake band which is shown as T-shaped in cross section, includes a major segment 14 and a minor segment 16 separated therefrom, the segment 14 being anchored to the plate 10 in some suitable fashion, preferably in that which is disclosed and described herein, although it will be understood that other suitable anchoring means may be provided, if desired.

The segment 14 is provided with a flange 18, and the latter is cut away, as on the lines 20 to provide a notch in which certain of the parts forming the anchoring means may be disposed. Secured to the flange 18, on either of the cut lines 20, by welding, riveting, etc., as desired, is a backet member 22 (Fig. 3). The latter includes a pair of wings 24, adapted to abut the flange 18 and marginally curved, as is shown at 26, to correspond to the curve of the brake band segment 14. The bracket 22 also includes a pair of seats 28 connected by a curved web 30, the seats being provided with aligned perforations 32 for a purpose to be described and being disposed in the notch between the cut lines 20 in the flange 18. The bracket surfaces which are to abut corresponding surfaces of the segment are those surfaces of the wings 24 to which the lead lines extend, and the convex surface of the web 30, as will be observed.

Secured to the anchor plate 10, also by welding, riveting, bolting, etc., as desired, are a pair of L-shaped members 34 (Fig. 3), each of which includes a wing 36, marginally curved as at 38, and a seat 40, provided with a perforation 42, the latter being elongated for a purpose to be described, the members 34 together forming a bracket whose seats 40 are fitted between the seats 28 of the bracket 22, and whose wings 36 are in abutment with the anchor plate, as observed, in Fig. 2, the brackets being so disposed that apertures 32 and 42 are substantially in alignment.

Between the seats 40 is disposed an operating lever 50 having perforation at 52 adapted to be aligned with the perforations 32 and 42, and having a shank 54 extending thru a slot or aperture 56 in the anchor plate, the shank being provided with an aperture 58 in which may be disposed a pin or bolt forming a connection between the lever and the end 60 of the brake rod 62, thru which the brake applying force is applied to the lever and consequently to the brake.

Disposed within the aligned perforations 32, 42, and 52, and traversing seats 28 and 40, and lever 50, is a pin 66, the latter forming a pivotal mounting for the lever, an anchor for the brake band segment 14, and a connection between the lever and the segment.

The lever 50 is provided with a notch 70 in which may be disposed one end of an operating link 70 in which may be disposed one end of an operating link 72, the latter being forked as at 74, to create a more efficient connection between the link and the lever. The other end of the link is also forked as at 76, to straddle a pin 78 disposed between and connecting the operating rings 80, the rings being provided with arms 82 connected to the segment 16, the connection being established in any suitable manner, a pin and cotter key connection being shown at 84.

Further, there are provided resilient members 86, connecting the ends of pin 66 with the rings 80, for purposes to be described later, these members being in the form of coiled tension springs, as shown.

The operation of the foregoing parts will readily be observed. The brake band segments, which are provided with the usual linings 88, are normally spaced from the drum 12, the clearance between the linings and the drum being in the neighborhood of one-thirty-second of an inch ($\frac{1}{32}$ in.) a highly desirable clearance and one which is practical in this form of brake, tho extremely unsatisfactory in other forms well known to the present inventor.

Application of a force on the lever 50, acting in the direction indicated by the arrow of Fig. 4, will cause the lever to rotate on its pivot, the pin 66, and move the link 72 towards the pin 78, thereby causing ring 80 to be moved to the right (Fig. 1) and to move the minor segment 16 outwardly or also to the right (Fig. 1) until its lining 88 frictionally engages the drum 12, restraining the rotation of the latter. The reaction caused by the rotation of the lever causes the pin 66 to move in the elongated aperture 42 towards the left (Fig. 1), thereby causing the bracket 22 and with it, the major segment 14, also to move to the left, whereupon the lining carried by the latter will also engage the drum.

It will thus be seen that the drum is engaged at two oppositely disposed portions and by two oppositely disposed and separated segments. It will further be seen that the band anchor is "full-floating" with respect to the anchor plate, a feature permitting effective braking despite the great clearance maintained between the band lining and the drum.

The segments 14 and 16 will be projected outwardly so long as the force is maintained upon the rod 62. When the force is released, the springs 86 will contract, drawing segments 14 and 16 inwardly and removing the braking influence from the drum.

A feature of the invention is the means to cause additional braking upon the arising of extraordinary brake loads, and such means will now be described.

Secured to the flange 18 of a segment 14, at diametrically opposed points, are a pair of inwardly projecting radially disposed members 94, each of which is provided with a slot 96 and a pair of relatively displaced fork portions 98, the latter being welded to opposite sides of the flange 18, as shown in Fig. 1. Each member 94 is nested between the rings 80 so as to present an edge 100 in operative engagement with the rollers 102 carried on the pins 104 connecting the rings. It will be seen that in the event of the drum 12 "grabbing" the segment 16 and tending to carry it around the segment center, the rings 80 will rock in the direction of rotation of the drum, whereupon one of the rollers 102 will be forced upwardly and one will be forced downwardly, tending to project the members 94 and consequently the major segment 14 outwardly. In this manner additional braking effect is obtained upon the arising of a "grabbing" action due to extraordinary brake loads.

In order to guide the movable elements 94 and also in order to provide additional anchorage means for the major segment 14 and the parts operatively connected thereto, there are provided a pair of studs 110, secured to the anchor plate at oppositely disposed points (Figs. 1 and 2) each of which includes a spool portion 112 in alignment with the slots 96 of the members 94. The spools 112 enable the members 94 to ride radially in the assembly, but prevent the members 94 and consequently, the segment 14 and all parts connected thereto, from rotating around the segment center, and from moving towards and away from the anchor plate, as will be observed from Fig. 2.

Further, secured to the anchor plate at the points 116 and to the segment 14 at the points 118 are coiled tension springs 120, these being provided, as is usual in brakes of this character, to assist in the proper centering of the segment 14, as will be readily understood.

It will be seen, therefore, that there has been provided a brake which is so constructed that a substantial clearance may be maintained between the brake band and the drum, without deleteriously affecting the efficiency of the brake.

It will further be seen that there is provided a brake whose band segments are relatively separated tho operatively connected, for the purposes to be described.

Further, it will be observed that there has been provided a brake whose band segment is anchored at a plurality of points all of the anchors being of the "full-floating" type, whereby a great range in the movement of the segment is permitted.

It will also be seen that there has been provided an efficient, economical, and simple brake, possessing many of the advantages and few of the disadvantages of the brakes previously known.

Now, having described the invention and the preferred embodiment thereof, it is to be understood that the said invention is to be limited, not to the specific details herein set forth, but only by the scope of the claims which follow:

1. In a brake, an anchor plate, separated brake band segments, means anchoring one of said segments at one point to said plate, an operating ring connected to the other of said segments, an operating lever, and an operating link connecting said lever and said ring, said lever being pivotally mounted so that it may move, upon application of braking force thereto, to move said link, ring and band segment to their braking position, the anchoring means serving also as the pivotal mounting for said lever.

2. In a brake, an anchor plate, separated brake band segments, means anchoring one of said segments at one point to said plate, an operating ring connected to the other of said segments, an operating lever, and an operating link connecting said lever and said ring, said lever being pivotally mounted so that it may move, upon application of braking force thereto, to move said link, ring and band segment to their braking position, the anchoring means serving also as the pivotal mounting for said lever, and including perforated brackets integrally secured to said plate, perforated brackets integrally secured to said band, and a pin passing thru the perforations in the brackets and thru the lever.

3. In a brake, an anchor plate, separated brake band segments, means anchoring one of said segments at one point to said plate, an operating ring connected to the other of said segments, an operating lever, and an operating link connecting said lever and said ring, said lever being pivotally mounted so that it may move, upon application of braking force thereto, to move said link ring, and band segment to their braking position, the anchoring means serving also as the pivotal mounting for said lever and including perforated brackets integrally secured to said plate, perforated brackets integrally secured to said band, and a pin passing thru the perforations in the brackets and thru the lever, the perforations in the anchor plate brackets being elongated so that said pin can slide therein.

4. In a brake, an anchor plate, separated brake band segments, means anchoring one of said segments at one point to said plate, an operating ring connected to the other of said segments, an operating lever, and an operating link connecting said lever and said ring, said lever being pivotally mounted so that it may move, upon application of braking force thereto, to move said link, ring, and band segment to their braking position, the anchoring means serving also as the pivotal mounting for said lever and including perforated brackets integrally secured to said plate, perforated brackets integrally secured to said band, and a pin passing thru the perforations in the brackets and thru the lever, the perforations in the anchor plate brackets being elongated so that said pin can slide therein, there being provided resilient means to return said link, ring, and band segment to their normal or non-braking position, the pin also serving as a mounting means for the resilient means aforesaid.

5. In a brake, an anchor plate, separated brake band segments, means anchoring one of said segments at one point to said plate, an operating ring connected to the other of said segments, an operating lever, and an operating link connecting said lever and said ring, said lever being pivotally mounted so that it may move, upon application of braking force thereto, to move said link ring, and band segment to their braking position, the anchoring means serving also as the pivotal mounting for said lever and including perforated brackets integrally secured to said plate, perforated brackets integrally secured to said band, and a pin passing thru the perforations in the brackets and thru the lever, the perforations in the anchor plate brackets being elongated so that said pin can slide therein, there being provided resilient means to return said link, ring, and band segment to their normal or non-braking position, the pin and the ring also serving as a mounting means for the resilient means aforesaid.

6. In a brake, an anchor plate, separated brake band segments, means anchoring one of said segments at one point to said plate, an operating ring connected to the other of said segments, an operating lever, and an operating link, connecting said lever and said ring, said lever being pivotally mounted so that it may move, upon application of braking force thereto, to move said link ring and band segment to their braking position, the anchoring means serving also as the pivotal mounting for said lever, and means including perforated brackets integrally secured to said plate, perforated brackets integrally secured to said band, and a pin passing thru the perforations in the brackets and thru the lever, said brackets being interfitted.

ALFRED T. KVARNSTROM.